Patented Oct. 15, 1929

1,732,111

UNITED STATES PATENT OFFICE

HELIODOR ROSTIN, OF CHARLOTTENBURG, NEAR BERLIN, GERMANY

PROCESS FOR CONVERSION OR PURIFICATION OF HYDROCARBON FLUIDS

No Drawing. Application filed February 29, 1928, Serial No. 258,127, and in Germany March 1, 1927.

According to U. S. A. Patent 1,451,052 unsaturated hydrocarbons are being converted into saturated ones by being conducted together with sulfuretted hydrogen over bodies which are able to combine with the sulfur and to liberate the hydrogen in nascent form.

Further work on this subject has shown that finely divided iron is particularly suitable for the above purpose because it not only combines with the sulfur of the sulfuretted hydrogen while it liberates the hydrogen with great ease, but also because it can easily be regenerated by means of hydrogen or gases containing hydrogen, yielding again sulfuretted hydrogen.

The reaction may be accelerated by increasing the fineness of division of the iron. Reduced iron, such as can be obtained for instance by the reduction of natural metallic ores such as "minette", is particularly suitable.

The following is an example of the way in which the invention is carried out: a vertical tube is filled with iron, for instance in the form of iron oxide or "minette", preferably granulated. Hydrogen or other reducing gases are then conducted through the pipe at temperatures of about 200–300° C.

When the reduction is accomplished, the materials which for instance hydrocarbons, products of carbonization or cracking processes and the like, are to be treated, are conducted together with sulfuretted hydrogen into the lower end of the tube.

The hydrogen sulfide is decomposed by the reduced iron in such a manner that the sulfur combines with the iron while the hydrogen is liberated and reacts in its nascent form with the bodies under treatment.

When the iron has been sulfurized the flow of the materials under treatment and of the sulfuretted hydrogen is interrupted. Hydrogen or gases containing hydrogen are introduced instead at the top end of the tube, also at an elevated temperature and a process of desulfurization of the iron sets in immediately: the hydrogen combines with the sulfur of the sulfurized iron forming sulfuretted hydrogen, the iron or ore remaining in the reduced form.

The process has been successfully applied to a variety of purposes. Two examples may serve as illustrations:

(1) Purification and improvement of coal gas and similar products as for instance water gas:

Iron oxide or ore like minette is reduced at a temperature of 200–300° C. by means of hydrogen or water gas after which a mixture of coal gas, or water gas, or both, and sulfuretted hydrogen is led over the material.

The analysis of the gas shows:

| | At the inlet Per cent | At the outlet Per cent |
|---|---|---|
| $CO_2$ | 3 | 3.3 |
| $C_nH_m$ (heavy hydrocarbons) | 1.5 | 1.6 |
| CO | 14.2 | 11.6 |
| $H_2$ | 43.0 | 51.6 |
| $CH_4$ | 16.9 | 18.7 |
| $N_2$ | 13.2 | 13.2 |
| $H_2S$ | 8.2 | 0.0 |

From the analysis it is evident that while the sulfuretted hydrogen has entirely disappeared and the amount of carbon monoxide has diminished by 2.6%, the amount of methane and of free hydrogen has risen considerably, obviously part of the CO being reduced.

The effect can be increased by adding greater quantities of $H_2S$ and it has been observed that by such means oil can be produced which was not contained in the gas previously.

(2) Treatments of oils, products of pyro-dissociation cracking and the like which tend to become darker and to resinify or polymerize and which have a disagreeable smell and react readily with sulfuric acid.

Such materials are treated preferably in the form of vapours in the same manner as under No. 1 and show after condensation none of the detrimental properties of the original.

Crude benzole, a brown, disagreeably smelling liquid which suffered a loss of about 20% of its substance when shaken with sulfuric acid has been obtained after the treatment described above as a water white product with an absolutely pure smell. This product had a loss of less than 1% when shaken with sulfuric acid.

The process has the same effect upon various other compounds which may be conveniently referred to as carbon containing compounds, such as cracked gasoline and similar substances.

The iron for the purposes of this process is most suitably applied in the granulated form. Powdered iron offers too great a resistance to the passage of gases or vapours. Particularly suitable are iron ores, for instance minette because (1) they can be obtained in granules of an exactly predetermined size and (2) because the iron is finely distributed and divided or spread in the porous structure, this structure constituting a skeleton support for the finely divided iron to provide intimate and effective contact between the reacting substances.

What I claim is:—

1. A process of hydrogenating carbon containing compounds which comprises conducting the compounds together with sulfuretted hydrogen over finely divided iron at a temperature sufficiently high to cause the release of nascent hydrogen and the reaction of the released hydrogen with the compound.

2. A process of hydrogenating carbon containing compounds which comprises conducting the compounds together with sulfuretted hydrogen over iron in the form of reduced ore at a temperature sufficiently high to cause the release of nascent hydrogen and the reaction of the released hydrogen with the compound.

3. A process of hydrogenating carbon containing compounds which comprises conducting the compounds in gaseous form together with sulfuretted hydrogen over iron which has been freshly reduced and heating the reacting substances to a temperature of approximately 200° C.

4. A process of hydrogenating carbon containing oils which comprises conducting the oils together with sulfuretted hydrogen over reduced ore with the application of sufficient heat to cause the release of nascent hydrogen and the reaction of the released hydrogen with the oil.

5. A process of hydrogenating carbon containing compounds which comprises conducting the compounds together with sulfuretted hydrogen over finely divided iron in the form of ore at a temperature sufficiently elevated to cause the release of nascent hydrogen and the reaction of the released hydrogen with the compound and thereafter conducting hydrogen over the sulfuretted iron to recover the iron.

In testimony whereof I affix my signature.

HELIODOR ROSTIN.